United States Patent

Tanaka et al.

Patent Number: 5,991,049
Date of Patent: Nov. 23, 1999

[54] TRANSPARENT SUBSTRATE HAVING RAIN SENSOR

[75] Inventors: Shuhei Tanaka; Tadashi Koyama; Keiji Tsunetomo; Hideki Imanishi, all of Osaka, Japan

[73] Assignee: Nippon Sheet Glass Co., Ltd., Osaka, Japan

[21] Appl. No.: 09/120,142

[22] Filed: Jul. 22, 1998

[30] Foreign Application Priority Data

Jul. 22, 1997 [JP] Japan ................................ 9-195540

[51] Int. Cl.⁶ .................................................. G01N 21/55
[52] U.S. Cl. ........................... 356/445; 356/328; 356/334
[58] Field of Search .................................... 356/388, 334, 356/328, 445

[56] References Cited

U.S. PATENT DOCUMENTS 3,870,417  3/1975  Bashank .................................. 356/442
5,483,346  1/1996  Butzer .................................. 356/239.1

FOREIGN PATENT DOCUMENTS 60-216245  10/1985  Japan.
62-163949  7/1987  Japan.
6-509652  10/1994  Japan.
8-261974  10/1996  Japan.

Primary Examiner—Frank G. Font
Assistant Examiner—Reginald A. Ratiff
Attorney, Agent, or Firm—Pillsbury Madison & Sutro, LLP

[57] ABSTRACT

A front windshield 1 having a rain sensor 2 for detecting the adhesion or presence of water drops W upon one side surface thereof, depending upon variation in an amount of reflected light, wherein the rain sensor 2 comprises: a light emitting element 7 for introducing a sensing light beam into the front windshield 1; a light receiving element 8 for detecting the light beam which is propagated by total internal reflection within the front windshield 1; and diffraction gratings 5, 6 formed on a surface of a glass substrate 4, through which the light emitting element 7 and the light receiving element 8 are provided on glass surface, whereby the rain sensor 2 is adhered on the other side surface of the front windshield 1 by means of an adhesive material 3 having a refractive index equivalent to that of the glass substrate 4.

2 Claims, 4 Drawing Sheets

TRANSPARENT SUBSTRATE HAVING RAIN SENSOR

BACKGROUND OF THE INVENTION

1. Field of the Invention

The present invention relates to a transparent substrate having a rain sensor for detecting adhesion or presence of water drops upon the transparent substrate, such as a windshield, by using a light emitting element and a light receiving element.

2. Description of the Related Art

Conventionally, a device for automatically actuating a wiper by detecting the adhesion of rain drops upon a windshield of an automobile is known, and as such a substrate provided with such a detecting function is already known as shown in FIG. 5.

In Japanese Laid-open Patent No. Sho 60-216245 (1985), there is disclosed a device wherein the detection sensitivity is poor in the case where light from a light source is propagated within a glass plate by total internal reflection therein and is incident upon a light receiving element through a prism, as in the detection method mentioned above. Therefore, the angle of the prism is set up so that light from a water drop is incident upon the light receiving element only when water drops adhere to or are present upon the glass plate.

Further, in Japanese Laid-open Patent No. Sho 62-163949 (1987), there is disclosed a construction in which two light sources are prepared, wherein the incident angle of light flux from one of the light sources is set at a value greater than the critical angle for total internal reflection to occur upon a detection surface, while light flux from the other is less than that of the critical angle thereupon, thereby enabling discrimination as to whether water (drops) are adhering to or are present.

Moreover, in Japanese Laid-open Patent No. Hei 8-261974 (1996), there is disclosed a construction in which comb-shaped transparent electrodes are provided inside a glass plate, wherein change in electrostatic capacitance between these transparent electrodes, which is caused by the adhesion or presence of the water drops, is detected so as to open or close the window and/or to control a heater.

Moreover, in Japanese Laid-open Patent No. Hei 6-509652 (1994) (prosecuted via PCT application), there is disclosed a construction in which a sensing unit made of, for example, a prism is adhered, by means of an intermittent layer having two (2) adhesive surfaces, onto an interior surface of a windshield, consequently sensing the water drops upon the outside surface of the windshield and controlling the operation of the wiper for the windshield.

In the prior art comprising the optical sensing function as mentioned above, the prism(s) is/are essential parts for introducing the light into the glass to undergo total internal reflection, and the prism(s) must be closely contacted upon the glass surface. Therefore, it is difficult and costly to install such devices. In particular, since the glass in most windshields is formed into a curved design, it is difficult to achieve closely contacted adhesion. This is a problem.

Further, it is necessary that the prism and the glass surface must match each other in the refractive index thereof for prohibiting unnecessary reflection at the boundary surface between them (i.e. refractive index matching). For this purpose, a layer for the matching can be provided between them, however, this increases the number of processing steps during manufacturing and is, therefore, costly. This is also a problem.

On the other hand, a system that detects the change in electrostatic electric capacitance, the electric resistance between the electrodes, or the like is inferior in durability and sensitivity to that of the optical type. In particular, as the front windshield glass for use in an automobile, it is important that the sensed signal correspond to or vary with the visibility seen by a driver or a fellow passenger, and therefore, an optical sensor is preferable.

SUMMARY OF THE INVENTION

In accordance with the present invention, for resolving the drawbacks in the conventional art mentioned above, there is provided a transparent substrate having a rain sensor for detecting adhesion or presence of water drops upon one side surface thereof, depending upon the variation in an amount of reflected light, wherein said rain sensor comprises:

a light emitting element for introducing a sensing light beam into said transparent substrate;

a light receiving element for detecting a light beam which is propagated by total internal reflection within said transparent substrate from said sensing light beam; and a diffraction grating formed on a surface of the transparent substrate, through which said light emitting element and said light receiving element are provided on said glass surface, wherein said rain sensor substrate is adhered onto the other side surface of said transparent substrate by an adhesive material having a refractive index equivalent to that of said transparent substrate.

According to the present invention, since light is introduced into the transparent substrate and the diffraction grating is used for changing the angle of the light so as to cause total internal reflection within the transparent substrate, there is no necessity to use the prism as is in the conventional art. Namely, since the glass substrate on which the diffraction gratings are formed is adhered upon a windshield, it can be attached thereon in an after-process after attaching the windshield, and it is thereby possible to apply the same production process of the windshield, with basically no change therein.

Further, according to the present invention, it is preferable that said diffraction grating be formed by an ablation phenomenon caused by the irradiation of a laser beam directly upon the surface of said glass substrate.

By applying laser machining for forming the diffraction grating, the process itself becomes easy.

DESCRIPTION OF THE PREFERRED EMBODIMENTS

Hereinafter, detailed explanation of the embodiments according to the present invention will be given by referring to the attached drawings.

The diffraction gratings comprise optical elements in which fine grooves are formed upon the surface of the glass.

The pitch between the grooves is generally designed to be within the range from 0.4 to 3 μm, depending on the intended use thereof. A principal use of the diffraction grating is for spectrum separation of incident light. It can be used for separating or bending the light by an effect of the diffraction thereof in the case where monochromatic light is used as the light source.

Moreover, as a diffraction grating other than that mentioned above, for example, a diffraction grating of the reflection type, a slit-like diffraction grating, or further other diffraction gratings which change in refractive power periodically also can be used for the purposes of the invention.

Figure 3:
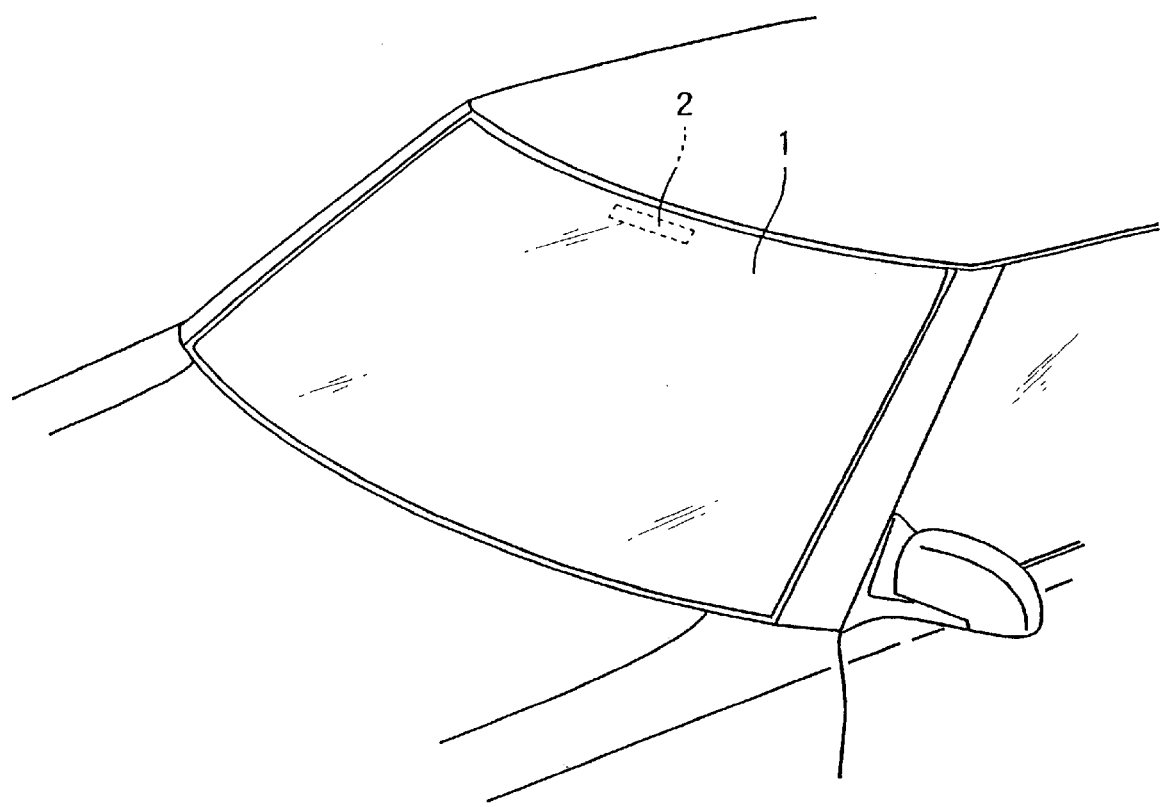
FIG. 3 shows a front part of an automobile, into which is applied a transparent substrate having a rain sensor according to the present invention.
Figure 4:
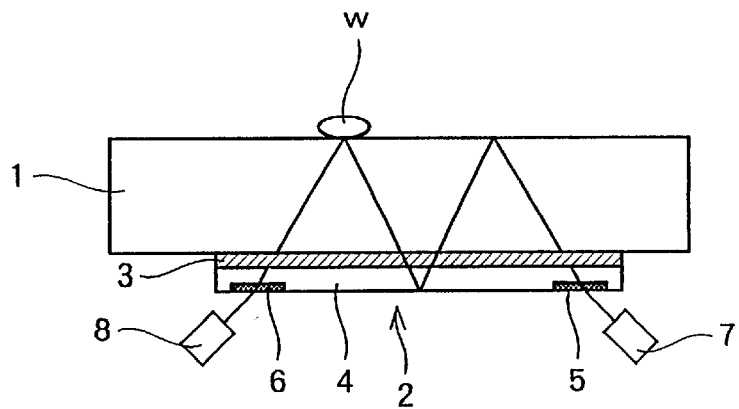
FIG. 4 is an explanatory view of the transparent substrate having a rain sensor according to the present invention.
Figure 5:
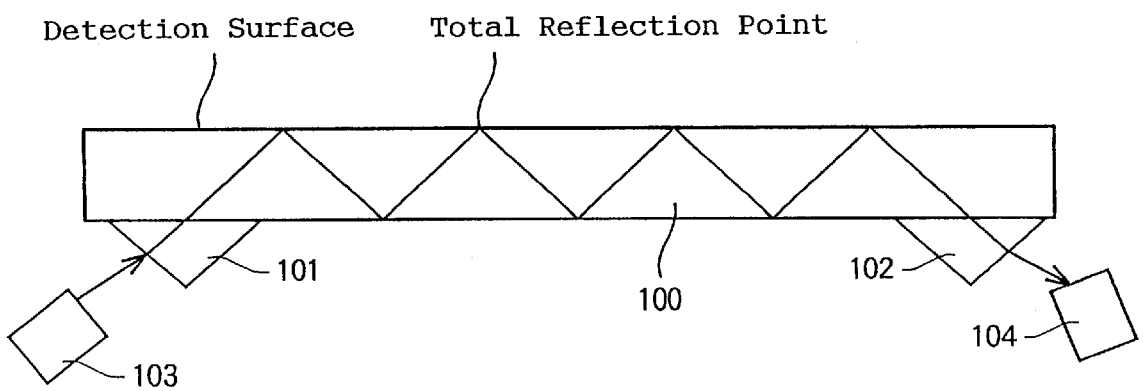
FIG. 5 shows an example of construction of the prior art.

The present invention using the diffraction gratings makes use of a phenomenon by which the diffracted light appears on the basis of a predetermined rule when monochromatic light is incident upon the diffraction grating. As shown in FIG. 3, the diffracted light generates a primary diffracted light (lobe) at a constant angle with respect to the incident light. Here, also diffracted light lobes of higher orders appear. However, since they are small in intensity, the light of the primary diffracted lobe is primarily used.

The angular relationship between the incident light and the diffracted light can be represented by the following equation when the incident light is incident upon the diffraction gating. Namely, assuming that the angle of the incident light is $\theta_0$, the angle of the diffracted light of m order $\theta$, the wavelength of the incident light $\lambda$, the pitch of the grooves d, the refractive index of the medium at the light exit side n, and the refractive index of the medium at the light incident side $n_0$, then the angular relationship is determined as below:

$$n \cdot \sin \theta - n_0 \cdot \sin \theta_0 = m\lambda/d (m=0, \pm 1, \pm 2, \ldots) \quad (1)$$

In case the where the light incident side is air and the light exit side is a transparent glass plate, since $n_0=1.0$, the angle of the light propagating within the transparent plate can therefore be adjusted by changing the angle of the incident light onto the diffraction grating.

As mentioned above, by using the diffraction grating, it is possible to introduce light into the transparent plate at an arbitrary angle. Further, by appropriately selecting the incident angle of the light onto the diffraction grating, it is also possible to set it in such manner that the introduced light experiences total internal reflection within the transparent plate.

Further, it is also possible have the light which is propagating within the transparent plate under total internal reflection to exit into the air on the basis of the same principal mentioned above.

As a general production method for the diffraction gratings, a master is formed by precisely cutting grooves on the surface of a soft metal like, for example, aluminum, by using a diamond needle. Then, the grating is obtained by transcribing the grooves onto a layer of epoxy resin which is coated on the surface of the transparent plate, i.e. the glass.

Alternatively, light is irradiated onto a surface of light sensitive resin which is coated on the surface of the transparent plate (the glass plate), by two-beam interference between two (2) light sources, and then only the exposed portion is etched therefrom. In addition, by etching the non-exposed portion, the fine grooves can be also realized.

Though the diffraction grating made by the production method mentioned above is basically applicable to the present invention, the diffraction grating obtained by transcribing the grooves onto the epoxy resin, or that formed on the light sensitive resin, lead to difficulties when it is applied to an environment of use where mechanical strength and/or weather resistance are required.

Further, when processing a windshield of a large size, it is difficult to apply the technology of transcription or the technology of exposure mentioned above, and therefore these methods are not appropriate from the viewpoint of practical use.

More preferably, the diffraction grating is formed directly on the transparent plate, by a laser machining process, i.e., using a phenomenon of partially ablating or evaporating the glass surface with a laser beam, as mentioned above.

The ablation phenomenon is caused due to absorption of the laser beam (light energy) by the glass. By making the glass substrate so that it contains silver at a predetermined depth from the surface thereof, in form of Ag atoms, Ag colloid or Ag ions, and further arranging the concentration gradient thereof to be the highest at the surface to be processed and gradually decreased to a predetermined depth, the ablation occurs sequentially from the processed surface portion into the inside of the glass, thereby avoiding cracking or breakage therein.

As methods for introducing the silver into the surface of the glass substrate, the following can be considered.

(1) a method in which a glass substrate containing a monovalent alkaline ions is dipped in a molten salt bath containing silver ions so as to produce an ion exchange; and, (2) a method in which a mixture of salt containing silver such as silver nitride with talc or the like, or a paste of silver powder is painted on the surface of the glass substrate which is then heated.

Figure 1:
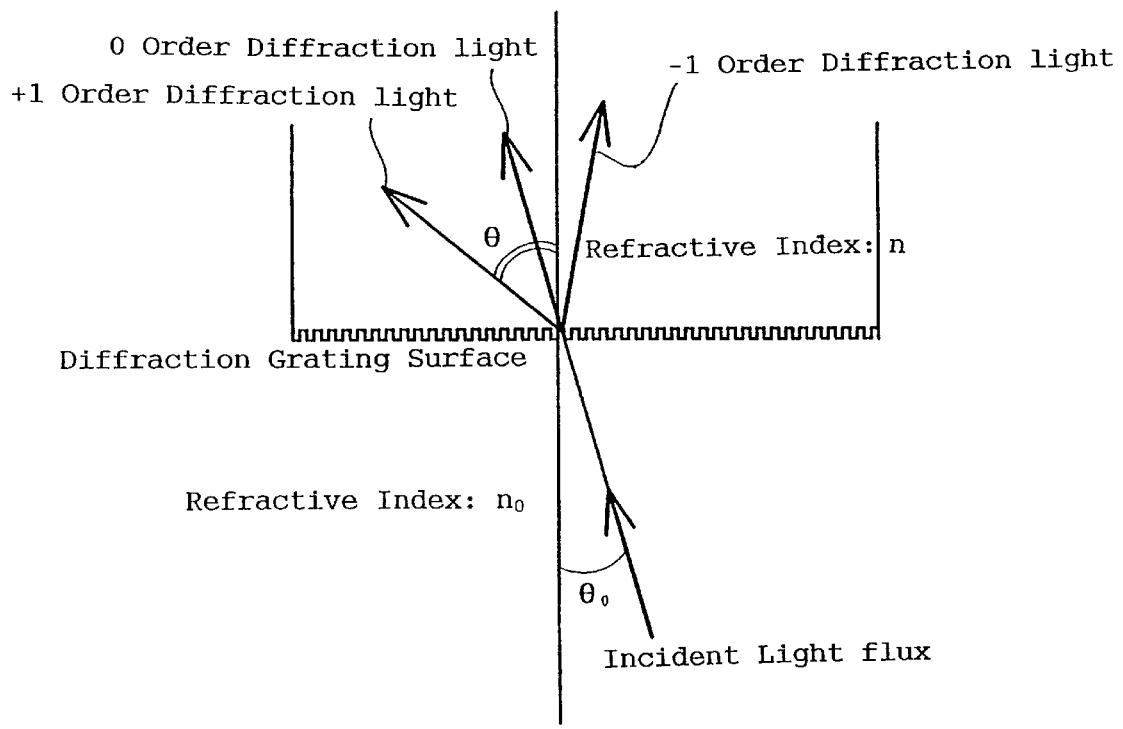
FIG. 1 is an explanatory view of the function of a diffraction grating used in the present invention.
Figure 2A:
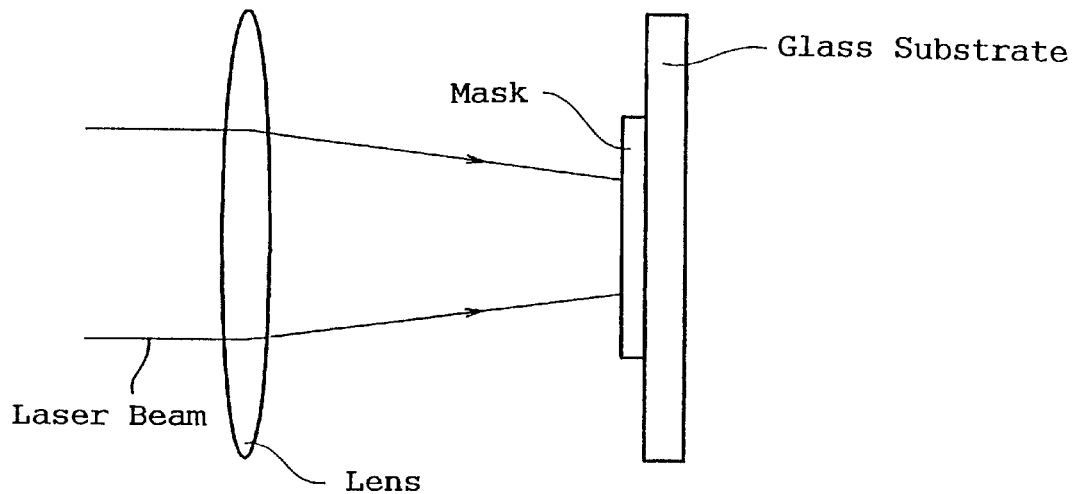
FIGS. 2(a) and (b) show an example of a production method of the diffraction grating according to the present invention.
Figure 2B:
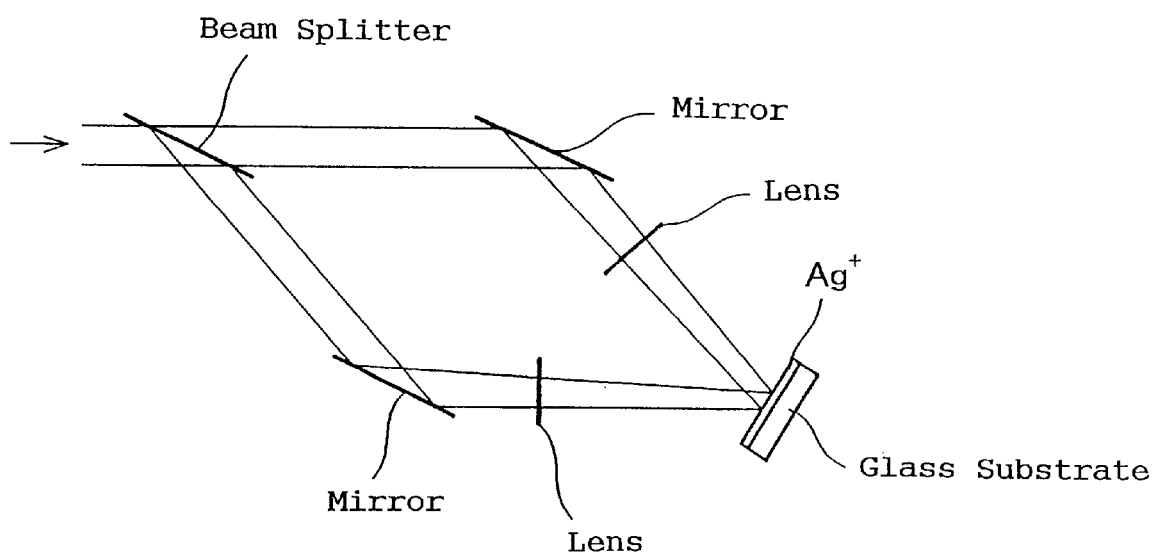

As the above-mentioned laser beam, laser light having a periodicity corresponding to the desired interval of the grooves is used so as to form fine grooves directly in the glass. For obtaining laser light having a periodic intensity distribution, there can be applied a method in which a mask is formed on the surface of the glass substrate and the laser light is irradiated thereupon through a lens, as shown in FIG. 2(a), or a method in which the laser beam is divided into two beams (FIG. 2(b)) which are then mutually interfered at a certain angle so as to obtain a periodic distribution of light intensity at the locations where they interfere with each other.

And, as shown in FIG. 3, the rain sensor 2 is attached with an adhesive (i.e. adhesive tape) 3, upon an interior side surface of a front windshield 1 of an automobile. As the adhesive (i.e. adhesive tape) 3 there is selected one which has a refractive index almost equal to that of the front windshield 1 (i.e., 1.48), for example, epoxy resin adhesive being curable by ultra violet (UV) light, a double-sided pressure-sensitive adhesive tape of acrylic resin, and so on. Further, as the front windshield 1 there is used a soda-lime glass substrate of a thickness of 5 mm, which mainly comprises $SiO_2$.

The rain sensor 2 comprises diffraction gratings 5, 6 which are formed on a surface of the glass substrate 4 by a laser beam. Further, the adhesive 3 is pasted on the entire surface over the glass substrate 4, thereby closely contacting the rain sensor 2 and the windshield 1 to each other.

Furthermore, in the vicinity of one diffraction grating 5 there is provided a light emitting means 7, which comprises a light emitting element, such as a light emitting diode (LED) or a laser diode (LD) or the like, while in the vicinity of the other diffraction grating 6 there is provided a light receiving means 8, which comprises a light receiving element, such as a photo diode (PD) or the like. The light emitting means 7 and the light receiving means 8 can be provided closely contacted with the diffraction gratings 5, 6.

Next, the formation of the diffraction gratings 5, 6 on the surface of the glass substrate 4 will be explained. First of all, for obtaining good laser machinability, the introduction of the silver ions the surface of the glass substrate is effected by the ion exchange method.

For effecting the Ag ion exchange, a molten salt of a mixture combining silver nitride and sodium nitride in a 50%—50% ratio is used, and the above-mentioned glass substrate is dipped for thirty (30) minutes in a reaction container. The molten salt is kept at a temperature of 285° C. in an electric furnace, and the reaction is conducted under air. With this processing, $Na^+$ ions in the glass surface flow out therefrom, while $Ag^+$ ions contained in the molten salt diffuse into the inside from the glass surface, achieving the ion exchange. Measuring the thickness of the layer into which the Ag diffuses by an X-ray micro-analyzer, it was found to be about 10 $\mu$m. The glass substrate 4 obtained in this manner shows good machinability (or processability) for the laser beam.

Next, by machining by use of the laser light having the periodic distribution in intensity thereof, the interference between the two (2) laser beams is applied to the substrate, as is shown in FIG. 2($b$).

Namely, in the present embodiment, an optical system is constructed such that the two (2) laser beams of wavelength 355 nm are incident upon each other at an angle of incidence of 20°. The period of the distribution of the light intensity is about 1,020 nm. The glass substrate 4 is so positioned that one surface thereof is present at the interfering region of the two (2) laser beams, and then the laser beam is irradiated to cause the ablation.

The lens shown in FIG. 2($b$) is used for the purpose of increasing the energy density of the light radiated upon the surface of the glass substrate 4, and the energy density per pulse is 30 J/cm$^2$ at the time when the ablation occurs. In measuring the period of the diffraction grating which is produced, it was found to be coincident with what was expected.

For obtaining the angle of the total internal reflection upon the boundary surface between the air and the glass, the following calculation is made using Snell's law. A general equation of Snell's law is shown in equation (2) indicated below:

$$n_0 \cdot \sin \alpha_0 = n \cdot \sin \alpha \qquad (2)$$

where, $\alpha$ and $\alpha_0$ define angles with respect to a normal on the boundary surface in the material of refractive index n and the material of refractive index $n_0$ ($\alpha$: incident angle, $\alpha_0$: angle of refraction).

In the case where the refractive index of the glass is n=1.48 as mentioned above, and the refractive index of the air $n_0$=1, the condition for obtaining total internal reflection within the glass plate is $\alpha_0$=90°. Therefore, an angle of $\alpha$=42.5° can be obtained from equation (2). Accordingly, if the incident angle $\alpha$ is equal to or greater than this angle (i.e. 42.5°), total internal reflection occurs within the medium of the glass.

Moreover, in the case where water adheres to or is present upon the glass, the condition where total internal reflection occurs is that angle $\alpha$ is equal to 42.5° ($\alpha$=64.0°), by the same calculation. Accordingly, under the condition that the incident angle $\alpha$ is within the range from 42.5° to 64.0°, total internal reflection will occur within the glass plate when water adheres to or is present thereon, while total internal reflection will not occur when no water adheres thereto or is present thereon, i.e., the light reflecting inside the glass is simply transmitted outside through the water.

For causing the reflection, the incident angle upon the diffraction grating is adjusted. The incident angle upon the diffraction grating such that the reflection angle comes to be 42.5° within the glass is calculated by using the above-mentioned equation (1). Upon a diffraction grating formed on the glass surface with a period of 1020 nm, it comes to be 22° when a positive primary (+1) diffracted light (lobe) of 633 nm from He-Ne laser is applied.

For making the reflection angle 64.0° inside the glass, it is apparent that the incident angle upon the diffraction grating should be 45° from the same calculation. In the present embodiment, the light is incident upon the diffraction grating 5 at the angle 45°. At this time, the light which experiences the total internal reflection exits from the other diffraction grating 6.

Moreover, in the case where a water drop W adheres or is present at the point where one example of total internal reflection occurs, the light which exits from the diffraction grating 6 is reduced (intensity), and in the case where water drops adhere or are present at all of the total internal reflection points, the output light is reduced to one-fiftieth ($\frac{1}{50}$).

Namely, it can be ascertained that the presence of the water on the glass surface can be sensitively detected so as to be indicated by the strength of the exit light. Further, when gradually increasing the incident angle upon the diffraction grating 5, the same phenomenon occurs.

However, when the incident angle is greater than 64°, the amount of exiting light does not change even if water or water drops are present. This is almost coincident with the angle where the condition of causing the total internal reflection to occur inside the glass does not change even if the water adheres upon the surface.

In addition, it should be noted that although the invention is applied to the front windshield of an automobile, the invention may be applied to any glass shield that is exposed to the elements. Additionally, although water drops are recited as the object of detection, the water may be in a different form, for example a thin film, so long as the total internal reflection phenomenon can occur.

Finally, although it is recited that the invention is used to drive a wiper blade, it may, as shown in the figures, be used to drive two or more such blades.

What is claimed is:

1. A transparent substrate having a rain sensor for detecting adhesion or presence of water drops upon one side surface thereof, depending upon variation in an amount of a reflected light, wherein said rain sensor comprises:

a light emitting element for introducing a sensing light beam into said transparent substrate;

a light receiving element for detecting a light beam which is propagated by total internal reflection within said transparent substrate from said sensing light beam; and a diffraction grating formed on a surface of the transparent substrate, through which said light emitting element and said light receiving element are provided on said transparent surface, whereby said rain sensor is adhered on the other side surface of said transparent substrate by an adhesive material having a refractive index equivalent to that of said transparent substrate.

2. A transparent substrate having a rain sensor as defined in claim 1, wherein said diffraction grating is formed by an ablation phenomenon caused by irradiation of a laser beam directly upon a surface of said glass substrate.

* * * * *